(12) United States Patent
Eicker et al.

(10) Patent No.: US 9,077,648 B2
(45) Date of Patent: Jul. 7, 2015

(54) DATA COMMUNICATION SYSTEM WITH MULTIPLE INPUT/OUTPUTS AND METHOD OF PROCESSING DATA PACKETS

(75) Inventors: Norbert Eicker, Wuppertal (DE); Thomas Lippert, Aschaffenburg (DE); Jens Hauke, Eggenstein-Leopoldshafen (DE)

(73) Assignees: PARTEE CLUSTER COMPENTENCE CENTER GMBH, Munich (DE); FORSCHUNGSZENTRUM JULICH GMBH, Julich (DE)

( * ) Notice: Subject to any disclaimer, the term of this patent is extended or adjusted under 35 U.S.C. 154(b) by 0 days.

(21) Appl. No.: 11/916,844

(22) PCT Filed: Jun. 9, 2006

(86) PCT No.: PCT/EP2006/005562
§ 371 (c)(1),
(2), (4) Date: Jul. 8, 2008

(87) PCT Pub. No.: WO2006/131390
PCT Pub. Date: Dec. 14, 2006

(65) Prior Publication Data
US 2009/0213866 A1    Aug. 27, 2009

(30) Foreign Application Priority Data

Jun. 10, 2005   (EP) ..................... 05012567

(51) Int. Cl.
*H04L 12/707* (2013.01)
*H04L 12/701* (2013.01)
*H04L 12/931* (2013.01)

(52) U.S. Cl.
CPC ............... *H04L 45/24* (2013.01); *H04L 45/00* (2013.01); *H04L 49/354* (2013.01)

(58) Field of Classification Search
None
See application file for complete search history.

(56) References Cited

U.S. PATENT DOCUMENTS 4,914,429 A * 4/1990 Upp .............................. 340/2.22
5,142,653 A * 8/1992 Schefts ......................... 370/253
(Continued)

FOREIGN PATENT DOCUMENTS

EP      1 049 299 A1   11/2000
EP      1 662 720 A     5/2006
(Continued)

*Primary Examiner* — Brian Roberts
(74) *Attorney, Agent, or Firm* — Banner & Witcoff, Ltd.

(57) ABSTRACT

A data communication system having a plurality of input/output ports, a first group and a second group of switching units. Each switching unit has a plurality of input/output interfaces, whereby at least one of the plurality of input/output interfaces of each switching unit of the first group forms an input/output port of the communications system, and at least one other input/output interface of each of the switching units of the first group is connected via a communication link with an input/output interface of one of the switching units of the second group, so that a network is formed having at least one loop. The network is logically divided in at least two virtual subnetworks, each forming a spanning tree. Each switching unit of the first group is configured to assign an incoming data packet arriving at a particular input/output port to a predetermined one of the at least two virtual sub-networks. An advantage of the present invention is the ability to transparently employ the taught data communication device in different computing environments, without the requirement to alter any external equipment.

15 Claims, 3 Drawing Sheets

(56) References Cited

U.S. PATENT DOCUMENTS

| | | | |
|---|---|---|---|
| 5,394,402 A * | 2/1995 | Ross | 370/402 |
| 6,990,106 B2 * | 1/2006 | Bhatia | 370/395.53 |
| 7,397,794 B1 * | 7/2008 | Lacroute et al. | 370/367 |
| 7,463,588 B1 * | 12/2008 | Tanaka et al. | 370/238 |
| 2002/0163922 A1 | 11/2002 | Dooley et al. | |
| 2005/0091396 A1 * | 4/2005 | Nilakantan et al. | 709/232 |
| 2006/0007939 A1 * | 1/2006 | Elangovan | 370/395.53 |
| 2006/0215672 A1 * | 9/2006 | Lawrence et al. | 370/401 |

FOREIGN PATENT DOCUMENTS

| | | |
|---|---|---|
| WO | WO 2005/015855 A | 2/2005 |
| WO | WO 2005/018175 A2 | 2/2005 |

\* cited by examiner

DATA COMMUNICATION SYSTEM WITH MULTIPLE INPUT/OUTPUTS AND METHOD OF PROCESSING DATA PACKETS

BACKGROUND OF THE INVENTION

The present invention refers to data communication systems. In particular, to a data communication system with a plurality of switching units and communication links forming a network having at least one loop, whereby the network is logically divided in at least two virtual sub-networks, each forming a spanning tree. More particularly, the present invention refers to a interconnecting network structure in an Ethernet environment.

Ethernet is turning out to be the preferred networking technology for recent deployments of Metropolitan Area Networks and Cluster networks. Economies of scale, ease of service provisioning, high bandwidth, ease of interconnection with LANs, and scalability are some of the prominent reasons for this preferential status of Ethernets.

Though Ethernet is a preferred technology for metro and cluster networks, it has certain serious shortcomings. Primarily, the spanning tree based switching mechanism in Ethernets utilizes at most N−1 links in a network of N switches. This limited utilization produces an imbalance of load which is impractical in MAN and cluster networks from a performance perspective.

Sharma et al.: "Viking: A Multi-Spanning-Tree Ethernet Architecture for Metropolitan Area and Cluster Networks", IEEE INFOCOM 2004, presents a system called 'Viking' addressing the aforementioned issues. The core idea of the Viking system is to use multiple spanning trees in conjunction with VLAN technology to maximize the overall throughput performance of the network by utilizing multiple redundant links. Further, Viking provides fault tolerant features by providing a mechanism to divert the affected communication over to alternate paths after detecting failures. In effect, Viking strives to provide a fault-tolerant traffic engineering solution for Metro Ethernets and Cluster Networks. Viking relies on Virtual LAN technology for selection of appropriate switching paths. VLANs are conventionally used to simplify network administration, reduce cost of segregation, and improve security. Viking deviates from this conventional paradigm and uses tag based VLANs to select the desired switching path between a pair of end-hosts. All paths which can possibly be used as switching paths are absorbed in different spanning trees. Since each spanning tree instance corresponds to a particular VLAN, explicit selection of a VLAN results in an implicit selection of the switching path associated with the corresponding spanning tree. In case of failures, the end-hosts merely need to change the VLAN id in subsequent frames to select an alternate switching path. Each of the end-hosts needs to run a Viking Node Controller (VNC) module which is responsible for VLAN selection during network operation.

Object of the present invention is to provide a data communication system with improved applicability in different computing environments.

SUMMARY OF THE INVENTION

The object is achieved by a system and a method according to the independent claims. According to the present invention, a data communication system is provided having a plurality of input/output ports for processing incoming data packets arriving at a first input/output port to be out-put via a second input/output port. The system of the present invention includes a first group of switching units and a second group of switching units. Each switching unit has a plurality of input/output interfaces, whereby at least one of the plurality of input/output interfaces of each switching unit of the first group forms an input/output port of the communications system itself. On the other hand, at least one other input/output interface of each of the switching units of the first group is connected via a communication link with an input/output interface of one of the switching units of the second group, so that a network is formed having at least one loop. The network is logically divided in at least two virtual sub-networks. According to the present invention, each switching unit of the first group is configured to assign an incoming data packet arriving at a particular input/output port to a predetermined one of the at least two virtual sub-networks. An advantage of the present invention is the ability to transparently employ the taught data communication device in different computing environments, such as computing clusters etc., without the requirement to alter any external equipment.

In operation, the active network elements of each of the respective virtual sub-networks form a spanning tree topology. As aforementioned, the present invention is directed to be implemented in an Ethernet environment. Hence, only spanning tree topology is allowed for each virtual sub-network. This is normally ensured by running the spanning tree protocol, which deactivates those links, which would form a loop. Therefore, it would be possible to define virtual sub-networks having loops, which would in the network start-up phase be removed. Preferably, the virtual sub-networks are already defined not to have loops. This would facilitate and quicken the start-up phase of the network for operation. Furthermore, it could be guaranteed which portions of each virtual sub-network are active during operation independently from the used algorithm in the spanning tree protocol.

The input/output port of the data communication system is basically an interface through which data are sent and received. The input/output ports are used to connect the data communication system of the present invention to computer networks or single computing devices such as personal computers, server computers, mainframes and the like. In other words, the communication system connects networks and/or computing devices attached to the individual input/output ports with each other.

In order to achieve a high bandwidth, each input/output port can be reached from another input/output port via different physical communication paths within the data communication system. Preferably, the internal structure of the communication system is arranged to have full bi-sectional bandwidth.

The data communication system processes data packets. A data packet is a block of user data together with necessary address and administration information attached, to allow the network to deliver the data to the correct destination. The data packet may be formed, e.g., by an IP (Internet Protocol) packet.

As already mentioned above, the internal structure of the data communication device is a network. The network may be seen as a plurality of network segments, which are connected by the switching units. The switching units allow a physical and logical star topology.

The switching units may be formed by a network switch. It should, however, be noted that more than one switching unit may be implemented in one single physical network switch. Whenever a data packet enters a switching unit, the switching unit saves the originating MAC (Media Access Control) address and the originating input/output interface (also referred to as "port") in the switch's MAC address table. The switch then selectively transmits the data packet from specific input/output interfaces based on the data packet's destination MAC address. If the destination input/output interface is the same as the originating one, the data packet is filtered out and not forwarded.

The input/output interfaces of the switching units basically correspond to the ports of the respective network switch.

A first group and a second group of switching units are differentiated. According to the claimed invention, the first group of switching units include input/output interfaces forming input/output ports of the data communication system, i.e., they are reachable from the outside, by external computer networks and/or computing devices attached to the data communication system. The second group of switching units do not share any input/output interfaces with the outside world of the data communication system. They are only connected via communication links to other switching units of the data communication system. Hence, a multi-stage interconnect network is formed by the switching devices and the respective communication links.

Such a multi-stage interconnect network usually provides different physical communication paths between at least one pair of input/output ports and/or input/output interfaces. Such a network topology is considered to have loops.

Logically dividing the network means to define a logical network on top of the physical network structure, in order to form virtual sub-networks. Virtual sub-networks may have a different topology than the physical network topology. According to the present invention, the network topology form a spanning tree, i.e., a tree of a connected, undirected graph, which includes every vertex of that graph.

It should be acknowledged that the virtual sub-networks could also be defined to have loops. However, since a spanning tree protocol is executed per virtual sub-network, i.e., per Virtual Local Area Network (VLAN), in operation each defined virtual sub-network would anyhow only have active network elements, such as communication links and routing units, forming a network topology according to a spanning tree.

A packet that is assigned to a virtual sub-network may only be routed in the virtual sub-network, i.e., forwarding of the packet functions correspondingly to a network only including the network elements, such as the switching units and communication links, of the virtual sub-network.

Advantageously, incoming data packets arriving at a particular input/output port are always assigned to the same predetermined one of the at least two virtual sub-networks. Hence, the decision over which virtual sub-network a particular data packet is to be transported is solely dependent on the input/output interface through which the data packet entered the switching unit. This allows to determine a virtual sub-network without the need to consult any central controlling unit or any external device. Furthermore, data packet transmission is entirely transparent when looking from the outside at the data communication system. The attached external networks and/or computing devices do not need to be aware of the internal functionality of the data communication system, no changes to such equipment need to be done, no additional software or hardware components need to be installed.

According to a preferred embodiment of the present invention, each of the other input/output interfaces of the switching units of the first group belong to one predetermined one of the at least two virtual sub-networks. As aforementioned the other input/output interfaces are the ones connecting a switching unit of the first group—i.e., those switching units having connections to external networks and/or computing devices—with switching units of the second group—i.e., those switching units being connected via communication links with other switching devices, of the first and/or of the second group. Data packets which are switched to another input/output interface being an input/output port, i.e., leading to the outside, of the same switch, are switched directly without being further routed through the internal network structure of the data communication system. However, if the destination input/output port is situated at another switching device, the data packet needs to be transported to the respective switching device. This is done by sending the data packet via the input/output interface belonging to the respective virtual sub-network the data packet got assigned to, over the respective communication link to another switching unit. In a three-stage interconnecting network, another switching step is necessary before the data packet reaches the switching unit that includes the input/output interface forming the destination input/output port.

It should be acknowledged that also multi-stage interconnecting networks with more than tree stages may be used. In this case additional switching and transmission steps within the data communication system would be necessary. However, in order to keep the latency for transporting the data packets from an incoming input/output port to an outgoing input/output port low, the number of stages should be kept small.

Input/output interfaces of switching units of the first group, which are forming input/output ports of the system are members of all virtual sub-networks. This advantageously allows to forward data packets having another input/output port of the same switching unit as its destination, directly to the respective input/output port. Furthermore, data packets reaching a switching unit via an internal communication link may advantageously switched to any of the input/output ports.

In a preferred embodiment of the present invention, each of the other input/output interfaces of a particular switching unit of the first group belongs to one single virtual sub-network. This advantageously reduces the risk of overloading one single input/output interface and the respectively connected communication link.

In a further advantageous embodiment, each of the other input/output interfaces of a particular switching unit of the first group belongs to different virtual sub-networks. This advantageously distributes the load of data packets to be forwarded internally over all internal input/output interfaces of the respective switching unit.

According to the present invention, each communication link only belongs to one virtual sub-network. This strict segregation of communication resources to different virtual sub-networks further decreases the risk of overloading single communication links. It should however be noted that a communication has duplex capability and it could be implemented that a particular link belongs to one virtual sub-network for one direction, whereas the other direction is assigned to a different virtual sub-network.

Advantageously, each of the other input/output interfaces of the switching units of the first group belongs to the same virtual sub-network as the respectively connected communication link. In other words, communication links and respectively connected input/output interfaces are members of the same virtual sub-network.

According to a preferred embodiment of the present invention, each virtual sub-network allows communication from any one of the switching units of the first group to all other switching units of the first group via at least one switching unit of the second group, assuming that the data packet is assigned to the corresponding virtual sub-network. I.e., each virtual sub-network advantageously includes all input/output interfaces, which are forming input/output ports of the system. Furthermore, each virtual sub-network advantageously includes a subset of other input/output interfaces and communication links, which allow to reach all other switching devices having input/output interfaces forming input/output ports, so that a data packet being assigned to its virtual sub-network is able to be routed to any input/output port of the data communication system.

Advantageously, all input/output ports of a particular switching unit of the second group belong to the same virtual sub-network. This allows to forward data packets without the need to assign them to a different virtual sub-network. However, it should be acknowledged that it could also be possible to assign data packets to a different virtual sub-network.

In a preferred embodiment of the present invention, there is also a segregation of entire switching units to different virtual sub-networks, i.e., each switching unit of the second group belongs to a different virtual sub-network. This facilitates the routing effort when setting up the system and significantly simplifies the processing within each switching unit. The switching units basically function in a way as no virtual sub-network would be defined.

Advantageously, each switching unit of the first group has the same number of input/output interfaces forming input/output ports of the system and other input/output interfaces being connected via respective communication links with input/output interfaces of switching units of the second group. In a preferred configuration each switching device has N=2·n input/output interfaces with (n=2, 3, . . . ), whereby N/2 input/output interfaces form input/output ports and the other N/2 input/output interfaces are used for internal connections.

According to a preferred embodiment of the present invention, at least some of the switching units are provided with static routing tables. The static routing tables are used to configure the respective switching unit to shape the traffic addressed to a distinct output port in a given virtual sub-network to a specific output interface of the respective switching unit. Advantageously, as a consequence, the system does not need to broadcast messages to all output interfaces in order to determine the one to be used for reaching a particular switching device. This allows for faster performance and reduces data traffic between the switching units.

The switching units of the second group advantageously have the same number of input/output interfaces as the ones of the first group.

In a preferred embodiment of the present invention, each of the switching units of the second group is connected via a communication link with each of the switching units of the first group, as to form a star topology around the respective switching device. In a three-stage interconnecting network, the switching units of the second group would belong to the second stage. In this scenario the claimed configuration would then allow that from one second-stage switching device each of the switching devices of the first and third stage could be reached over the respective virtual sub-network.

As aforementioned, the first and the second group of switching elements together with the communication links form a portion of a computer network. Hence, the data communication system according to the present invention could therefore advantageously be employed as a portion of a larger computer network or a computer switch or an interconnecting network between computing devices.

In a preferred embodiment of the present invention, the first and the second group of switching elements together with the communication links are arranged to form a Clos network (also known as Omega network). Clos networks are a class of multi-stage switching network topologies that provide alternate paths between inputs and outputs, making it possible to minimize or eliminate the blocking that can otherwise occur in such networks. Alternatively, other kind of networks may be used, such as Banyan, Delta, Butterfly or Benes networks.

When implementing a data communication system according to the present invention, one or more switching units may be formed by one physical network switch.

Although different wireless connections could be used for implementing the communication links, it is preferred to use wire-based connections, since they allow a higher bandwidth and better shielding between the different connections.

Advantageously, the virtual sub-networks are formed by Virtual Local Area Networks (VLAN) in an Ethernet environment. Ethernet switches are frequently provided with VLAN capability, since this is normally used for network segregation for security or maintenance reason.

The present invention may advantageously be employed in a network switch. Such a network switch may than be a portion of a computer network.

Furthermore, the data communication device according to the present invention may advantageously be employed to connect computing nodes of a computer cluster, in which at least a portion of the interconnecting computer network is formed by a data communication system according to the present invention. The same applies to an interconnecting network used in a computer grid.

According to the present invention a method is provided for processing data packets in a data communication system with a plurality of input/output ports connected via a network having at least one loop, whereby at least two virtual sub-networks are provided, whereby in operation the active network elements of each of the virtual sub-networks have a network topology according to a spanning tree. The method includes the following steps: Firstly, an incoming data packet arriving at a first input/output port of a first switching unit to be out-put via a destination input/output port is received. Then, in the first switching unit the incoming data packet is assigned to one of the at least two virtual sub-networks. Subsequently, the data packet is transmitted to the destination input/output port via the assigned virtual sub-network and out-put via the destination input/output port.

BRIEF DESCRIPTION OF THE DRAWINGS

As aforementioned a key advantage of the present invention is the provision of a data communication system which may easily be employed. The following presented preferred embodiments constitute only a small selection of possible implementations. They will now be described with reference to the attached figures, wherein.

DETAILED DESCRIPTION

Figure 1:
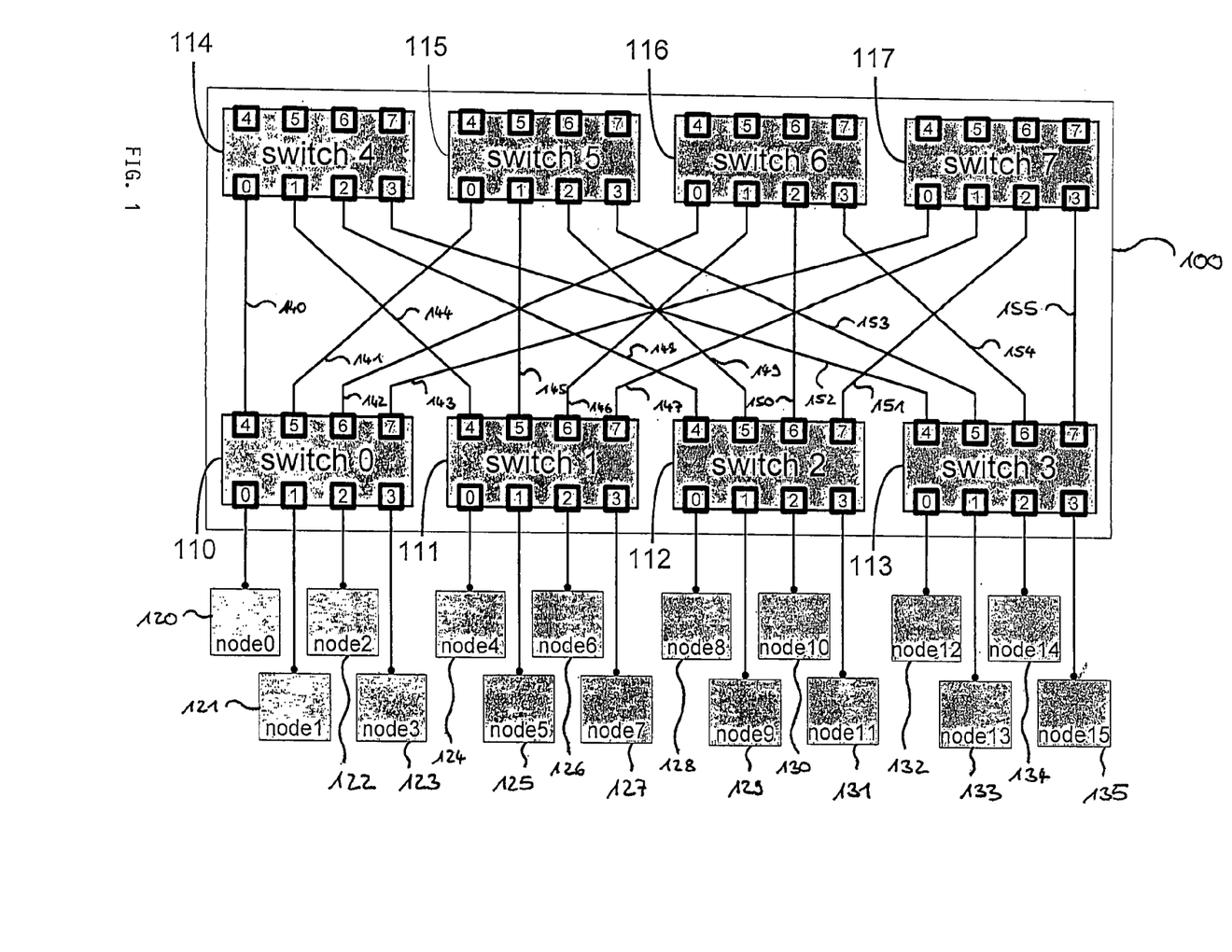
FIG. 1 shows a system according to the present invention using 8-port switches to implement a 16-port data communications system.

With reference to FIG. 1, there is depicted a system 100 according to the present invention using 8-port switches to implement a 16-port data communications system. The system includes eight 8-port switches 110, 111, 112, 113, 114, 115, 116 and 117 forming the switching units of the system 100. Each switch 110 to 117 is provided with eight input/output interfaces, the first switch 110 for example is provided with the input/output interfaces 110/0, 110/1, 110/2, 110/3, 110/4, 110/5, 110/6 and 110/7, the other input/output interfaces are denoted respectively.

The first switch 110, the second switch 111, the third switch 112 and the fourth switch 113 belong to a first group of switches. Each of the switches 110 to 113 of the first group have four input/output interfaces providing input/output ports for connecting 16 computing devices 120 to 135 also referred to as computing nodes. The first input/output interface 110/0 of the first switch 110 is, e.g., connected to the first node 120, whereas the sixteenth node 135 is connected to the fourth input/output interface 113/3 of the fourth switch 113, respectively.

The remaining four input/output interfaces of the switches 110 to 113 are used to attach communication links 140 to 155. Communication link 140 connects input/output interface 110/4 with input/output interface 114/0, whereas communication link 155 connects input/output interface 113/7 with input/output interface 117/3, respectively.

The fifth to the eighth switch 114 to 117 belong to a second group of switches only having internal connections to communications links. In other words, none of the input/output interfaces of those switches form an input/output port of the system. Furthermore it gets apparent from FIG. 1 that each switch of the first group 110 to 113 has one communication link connecting it to each of the switches of the second group 114 to 117. For example, from the first switch 110, communication link 140 connects to switch 114, connection link 141 connects to switch 115, communication link 142 connects to switch 116 and communication link 143 connects to switch 117. The other switches 111 to 113 have corresponding communication links 144 to 155 connecting them to switches 114 to 117 respectively.

The following virtual sub-networks are defined in the setup of FIG. 1. The first virtual sub-network includes the following communication links: 140, 144, 148 and 152, and all input/output interfaces connected with those communication links. Additionally all input/output interfaces forming input/output ports.

The second virtual sub-network includes the following communication links: 141, 145, 149 and 153, and all input/output interfaces connected with those communication links. Additionally all input/output interfaces forming input/output ports.

The third virtual sub-network includes the following communication links: 142, 146, 150 and 154, and all input/output interfaces connected with those communication links. Additionally all input/output interfaces forming input/output ports.

The fourth virtual sub-network includes the following communication links: 143, 147, 151 and 155, and all input/output interfaces connected with those communication links. Additionally all input/output interfaces forming input/output ports.

Each switch of the first group 110 to 113 is configured to assign incoming data packets to a virtual sub-network, depending on the input/output port the packets were arriving. In the presently depicted implementation example, data packets coming from the first node 120 arrive at input/output port 110/0 and are assigned to the first virtual sub-network. Data packets coming from the second node 121 arrive at input/output port 110/1 and are assigned to the second virtual sub-network. Data packets coming from the third node 122 arrive at input/output port 110/2 and are assigned to the third virtual sub-network. Data packets coming from the fourth node 123 arrive at input/output port 110/3 and are assigned to the fourth virtual sub-network. As apparent from this description, incoming data packets are assigned to the virtual data network the input/output interface belongs to which is drawn opposite of the input/output interface at which the data packet arrives. It should be acknowledged that bidirectional communication between to different nodes may us different virtual sub-networks per direction.

Since only four input/output interfaces of the switches 114 to 117 are used according to the example of FIG. 1, the switching units being implemented in switches 114 to 117 could be combined in a lower number of switches. E.g., the switching units implemented in the switches 114 and 115 could be implemented in one single 8-port switch, and the switching units implemented in the switches 116 and 117 could be implemented in another single 8-port switch. This would lead to a configuration in which the entire data communication system would only require a total number of six 8-port switches instead of eight as shown in FIG. 1. It should be acknowledged that different hardware implementations of the present invention are possible.

Figure 2:
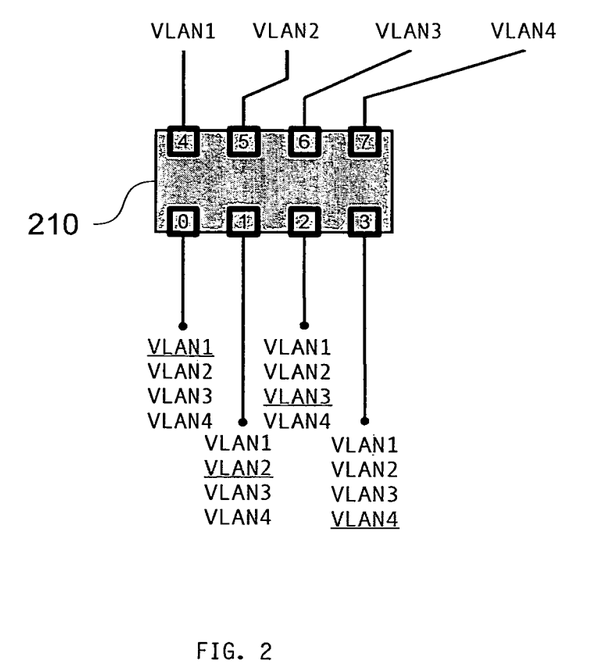
FIG. 2 shows a detail view of an 8-port switch as used in the systems according to the present invention.
Figure 3:
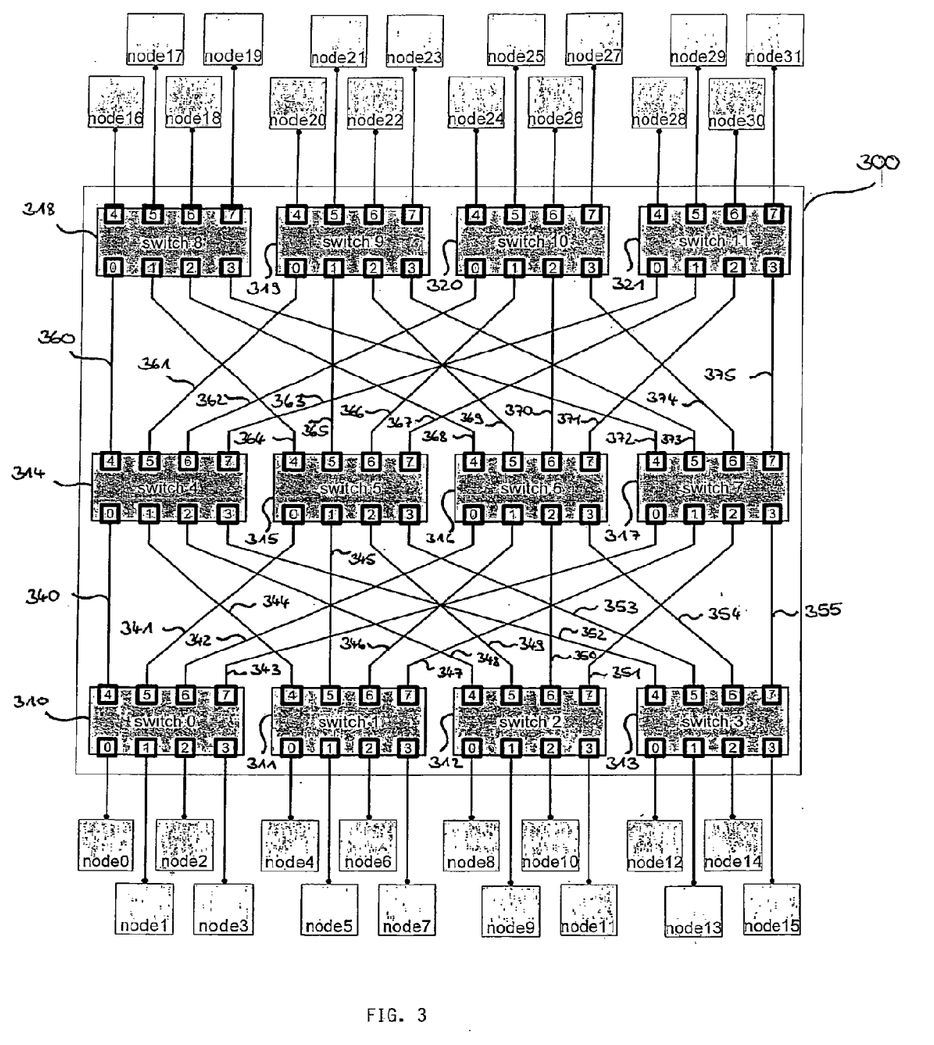
FIG. 3 shows a system according to the present invention using 8-port switches to implement a 32-port data communications system.

With reference now to FIG. 2, there is depicted a detail view of an 8-port switch 210 as used in the systems according to FIGS. 1 and 3. Switch 210 has 8 input/output interfaces 210/0 to 210/7. Four of which forming input/output ports of the system, namely input/output interfaces 210/0 to 210/3. The remaining input/output interfaces 210/4 to 210/7 provide connection to internal communication links (not shown).

As already explained in view of FIG. 1, the input/output ports 210/0 to 210/3 are members of all virtual sub-networks, whereas each of the internal input/output interfaces 210/4 to 210/7 are members of a dedicated virtual sub-network, i.e., input/output interface 210/4 belongs to the first virtual sub-network, Virtual Local Area Network 1, input/output interface 210/5 belongs to the second virtual sub-network, Virtual Local Area Network 2, input/output interface 210/6 belongs to the third virtual sub-network, Virtual Local Area Network 3, and input/output interface 210/7 belongs to the forth virtual sub-network, Virtual Local Area Network 4.

The switch uses the default VLAN functionality to assign the respective virtual sub-network to the incoming data packets.

Now with reference to FIG. 3 depicting a system according to the present invention using 8-port switches to implement a 32-port data communications system. The system includes twelve 8-port switches 310, 311, 312, 313, 314, 315, 316, 317, 318, 319, 320 and 321 forming the switching units of the system 300. Each switch 310 to 321 is provided with eight input/output interfaces, the first switch 310 for example is provided with the input/output interfaces 310/0, 310/1, 310/2, 310/3, 310/4, 310/5, 310/6 and 310/7, the other input/output interfaces are denoted respectively.

The first switch 310, the second switch 311, the third switch 312 and the fourth switch 313 as well as the ninth switch 318, the tenth switch 319, the eleventh switch 320 and the twelfth switch 321 belong to a first group of switches. Each of the switches 310 to 313 and 318 to 321 of the first group have four input/output interfaces providing input/output ports for connecting 32 computing devices node0 to node31. The first input/output interface 310/0 of the first switch 310 is, e.g., connected to the first node0, whereas the sixteenth node15 is connected to the fourth input/output interface 313/3 of the fourth switch 313, respectively.

The remaining four input/output interfaces of the switches 310 to 313 are used to attach communication links 340 to 355. Communication link 340 connects input/output interface 310/4 with input/output interface 314/0, whereas communication link 355 connects input/output interface 313/7 with input/output interface 317/3, respectively.

The remaining four input/output interfaces of the switches 318 to 321 are used to attach communication links 360 to 375. Communication link 360 connects input/output interface 318/0 with input/output interface 314/4, whereas communication link 375 connects input/output interface 321/3 with input/output interface 317/7, respectively.

The fifth to the eighth switch 314 to 317 belong to a second group of switches only having internal connections to communications links. In other words, none of the input/output interfaces of those switches form an input/output port of the system. Furthermore it gets apparent from FIG. 3 that each switch of the first group 310 to 313 and 318 to 321 has one communication link connecting it to each of the switches of the second group 314 to 317. For example, from the first switch 310, communication link 340 connects to switch 314, connection link 341 connects to switch 315, communication link 342 connects to switch 316 and communication link 343 connects to switch 317. The other switches 311 to 313 have corresponding communication links 344 to 355 connecting them to switches 314 to 317 respectively.

The following virtual sub-networks are defined in the setup of FIG. 3. The first virtual sub-network includes the following communication links: 340, 344, 348, 352, 360, 364, 368 and 372 and all input/output interfaces connected with those communication links. Additionally all input/output interfaces forming input/output ports.

The second virtual sub-network includes the following communication links: 341, 345, 349, 353, 361, 365, 369 and 373 and all input/output interfaces connected with those communication links. Additionally all input/output interfaces forming input/output ports.

The third virtual sub-network includes the following communication links: 342, 346, 350, 354, 362, 366, 370 and 374 and all input/output interfaces connected with those communication links. Additionally all input/output interfaces forming input/output ports.

The fourth virtual sub-network includes the following communication links: 343, 347, 351, 355, 363, 367, 371 and 375 and all input/output interfaces connected with those communication links. Additionally all input/output interfaces forming input/output ports.

Each switch of the first group 310 to 313 and 318 to 321 is configured to assign incoming data packets to a virtual sub-network, depending on the input/output port the packets were arriving. In the presently depicted implementation example, data packets coming from the node 0 arrive at input/output port 310/0 and are assigned to the first virtual sub-network. Data packets coming from the node 1 arrive at input/output port 310/1 and are assigned to the second virtual sub-network. Data packets coming from the node 2 arrive at input/output port 310/2 and are assigned to the third virtual sub-network. Data packets coming from the node 3 arrive at input/output port 310/3 and are assigned to the fourth virtual sub-network. Data packets coming from the node 4 arrive at input/output port 311/0 and are assigned to the first virtual sub-network again. As apparent from this description, incoming data packets are assigned to the virtual data network the input/output interface belongs to which is drawn opposite of the input/output interface at which the data packet arrives. It should be acknowledged that bidirectional communication between to different nodes may use different virtual sub-networks per direction.

The invention claimed is:

1. A data communication system with a plurality of input/output ports for processing incoming data packets arriving at a first input/output port to be outputted via a second input/output port and wherein other incoming data packets arrive at the second input/output port to be outputted via the first input/output port, said system including:
    a first group of switching units and
    a second group of switching units,
    whereby each switching unit has a plurality of input/output interfaces,
    whereby at least one of said plurality of input/output interfaces of each switching unit of said first group forms an input/output port of said communications system,
    whereby at least one other input/output interface of each of said switching units of said first group is connected via a communication link with an input/output interface of one of the switching units of said second group, so that a network is formed having at least one loop,
    whereby the network is logically divided into at least two virtual sub-networks,
    whereby in operation active network elements of each virtual sub-network have a spanning tree topology, wherein:
    each switching unit of said first group is configured so that an incoming data packet is assigned a predetermined one of said at least two virtual sub-networks based on the said particular input/output port through which said incoming data packet has arrived and wherein bidirectional data packet transmission between said first input/output port and said second input/output port uses different virtual sub networks per direction each of said other input/output interfaces of said switching units of said first group belong to a predetermined one of said at least two virtual sub-networks, wherein input-output interfaces of the switching units of said first group forming input/output ports of the system belong to all virtual sub-networks, wherein incoming data packets arriving at a particular input/output port are always assigned to the same predetermined one of said at least two virtual sub-networks, wherein switching units allow a physical and logical star topology;
    wherein, all input/output interfaces of a particular switching unit of said second group belong to the same virtual sub-network; wherein each switching unit of said second group belong to a different virtual sub-network.

2. The system according to claim 1, wherein, each of the other input/output interfaces of a particular switching unit of said first group belongs to one single virtual sub-network.

3. The system according to claim 1, wherein, each of said other input/output interfaces of a particular switching unit of said first group belongs to different virtual sub-networks.

4. The system according to claim 1, wherein, each communication link only belongs to one virtual sub-network.

5. The system according to claim 4, wherein each of said other input/output interfaces of the switching units of said first group belongs to the same virtual sub-network as the respectively connected communication link.

6. The system according to claim 1, wherein, each virtual sub-network allows communication from any one of the switching units of said first group to all other switching units of said first group via at least one switching unit of said second group.

7. The system according to claim 1, wherein, each switching unit of said first group has the same number of input/output interfaces forming input/output ports of the system and other input/output interfaces being connected via respective communication links with input/output interfaces of switching units of said second group.

8. The system according to claim 1, wherein, each of the said switching units of said second group is connected via a communication link with each of the switching units of said first group.

9. The system according to claim 1, wherein, said first and said second group of switching elements together with said communication links form a portion of a computer network.

10. The system according to claim 1, wherein, said first and said second group of switching elements together with said communication links are arranged to form a close network.

11. The system according to claim 1, wherein, one or more switching units may be formed by one physical network switch.

12. The system according to claim 1, wherein, said communication links are formed by wire-based connections.

13. The system according to claim 1, wherein, said virtual sub-networks are formed by Virtual Local Area Networks in an Ethernet environment.

14. A network switch comprising a data communication system according to claim 1.

15. A computer cluster including a plurality of computing nodes being connected via a computer network, wherein at least a portion of said computer network is formed by a data communication system according to claim 1.

\* \* \* \* \*